United States Patent [19]

Verzocchi

[11] 3,866,170

[45] Feb. 11, 1975

[54] BINARY TRANSMISSION SYSTEM USING ERROR-CORRECTING CODE

[75] Inventor: Federico Verzocchi, Milan, Italy

[73] Assignee: Societa Italiana Telecommunicazioni Siemens S.p.A., Milan, Italy

[22] Filed: Sept. 24, 1973

[21] Appl. No.: 400,060

[30] Foreign Application Priority Data

Oct. 3, 1972 Italy ................................ 30001/72

[52] U.S. Cl. ....................................... 340/146.1 AL
[51] Int. Cl. ............................................... H04l 1/10
[58] Field of Search............................ 340/146.1 AL

[56] References Cited

UNITED STATES PATENTS 3,373,404 3/1968 Webb ........................ 340/146.1 AL

*Primary Examiner*—Eugene G. Botz
*Assistant Examiner*—R. Stephen Dildine, Jr.
*Attorney, Agent, or Firm*—Karl F. Ross; Herbert Dubno

[57] ABSTRACT

A 6-bit binary word is fed into a coder including a 5-stage shift register for the five lowest-ranking bits and a flip-flop for the highest-ranking one. The register has feedback connections from its third and fifth stages to its input, including an Exclusive-OR gate, causing its fifth stage to read out a recurrent 31-bit maximum sequence in response to a train of stepping pulses. Depending on the value of the sixth bit stored in the flip-flop, another Exclusive-OR gate delivers either this sequence or its complement to a transmitter. On the receiving side, the arriving sequence is compared with the output of a similar feedback-connected shift register which is periodically loaded with a reference combination such as 11111 and which, upon every 33rd stepping pulse, starts one of 31 different permutations of a 31-bit maximum sequence which is thereupon compared bit by bit with the incoming sequence. In the event of a match with an original sequence or its complement, there are either 31 or 0 coincidences between bits; in all other instances the number of coincidences is 15 in the case of an original sequence and 16 in the case of its complement. In order to allow for transmission errors of up to 7 bits per sequence, the comparator works into a numerical discriminator generating an output signal if the number of coincidences per cycle. is at least 24 or not more than 7. The output signal, occurring just after the 31st stepping pulse, causes the readout of the contents of the associated shift register into a register upon the 32nd stepping pulse which re-establishes the word present therein at the beginning of the matching permutation. The register then contains the first five bits of the reconstituted word whose sixth bit is determined by the high or low count of the comparator.

8 Claims, 10 Drawing Figures

BINARY TRANSMISSION SYSTEM USING ERROR-CORRECTING CODE

FIELD OF THE INVENTION

My present invention relates to a system for the transmission of binary words with a predetermined number of bits over a communication path along which they may be subject to partial distortion.

BACKGROUND OF THE INVENTION

In order to detect and compensate for possible errors in transmission, it is known to introduce a certain amount of redundancy supplementing the actual information to be transmitted. Thus, an original message word of $n$ bits can be replaced by a code word having a larger number of bits, the code word being related to the message word by an algorithm which establishes the amount of redundancy and the manner of utilization of this redundancy to eliminate errors. There exists a definite optimum beyond which, with a given redundancy ratio, the proportion of detectable errors cannot be increased.

OBJECTS OF THE INVENTION

The general object of my present invention is to provide an improved transmission system using an error-correcting code which, within the limitation set forth above, is particularly simple and efficient in its operation.

A more particular object is to provide means in such a system, designed to handle message words of $n$ bits, for adapting it to words of $n + 1$ bits with only minor circuital additions.

SUMMARY OF THE INVENTION

These objects are realized, in accordance with my present invention, by the provision of a first shift register on the transmission side and a substantially identical second shift register on the reception side, each of these shift registers having $n$ stages to accommodate an $n$-bit code combination. Each shift register is further equipped with feedback means for driving it through a full cycle of $2^n - 1$ combinations whereby the bits appearing in any one stage thereof constitute a so-called maximum sequence of $2^n - 1$ bits. The term "maximum sequence" designates a succession of all possible $n$-bit combinations each occurring only once, with the exception of the all-zero (or all-one) combination which does not give rise to permutations in a feedback-connected shift register.

The maximum sequence thus generated in one stage (preferably the $n^{th}$ stage) of the first shift register, under the control of a train of first stepping pulses, is delivered to a transmitter which sends it out over a communication path to a receiver therefor. The receiver works into a storage circuit in which this incoming sequence is preserved while a similarly or complementarily generated maximum sequence, referred to hereinafter as a comparison sequence, is repeatedly read out from the second shift register under the control of a second train of stepping pulses. This readout takes place in a frame of at least $2^n - 1$ stepping cycles, each cycle consisting of a number of steps greater than $2^n - 1$ (preferably equal to $2^n$) whereby each cycle of a frame begins with a different starting combination in this shift register. A comparator is connected to the storage circuit and to the second shift register for successively comparing, bit by bit, the incoming sequence and each of the $2^n - 1$ comparison sequences of a frame, this comparator including a counter which registers the number of bit coincidences between the two sequences to be compared. A numerical discriminator, connected to the counter, generates an output signal whenever the number of bit coincidences in any stepping cycle of the second shift register falls outside a predetermined tolerance range which includes a mismatch-indicating count which is either $2^{n-2}$ or $2^{n-2} - 1$ and which therefore has the general formula $[(2^{n-1} - 1)/2] \pm ½$; an output circuit connected to the discriminator and controlled by an associated timer, which establishes the aforementioned cycles and frames, extracts from the second shift register the starting combination of the cycle in which the output signal is generated.

The tolerance range is defined by the maximum possible error as measured by a numerical value $e$ within which the count may deviate from its maximum (or minimum) value $2^n - 1$ (or zero), which indicates a complete match, or from its median value of $2^{n-1} - 1$ (or $2^{n-1}$), indicating a complete mismatch. Since the difference between the counts of complete match and complete mismatch is $2^{n-1}$, a maximum error of $2^{n-2} - 1$ on either side of the dividing line can be tolerated.

If the message word to be transmitted has $n + 1$ bits, the highest-ranking or $(n + 1)^{th}$ bit is entered into an ancillary binary stage on the transmission side whose setting does or does not invert the outgoing maximum sequence, depending upon the value of that bit. In such a system, therefore, the discriminator will generate a first kind of output signal in the case of a high count equal to or greater than $2^n - 1 - e$ (or, in other words, exceeding $2^n - 2 - e$) and will generate a second kind of output signal in the case of a lower count equal to or less than $e$ (or, in other words, lower than $e + 1$). While either kind of signal triggers the transfer of the starting $n$-bit combination from the second shift register to an output register, an ancillary output circuit regenerates the $(n + 1)^{th}$ bit according to the kind of output signal produced by the numerical discriminator.

BRIEF DESCRIPTION OF THE DRAWING

The above and other features of my invention will now be described in detail with reference to the accompanying drawing in which.

SPECIFIC DESCRIPTION

Figure 1:
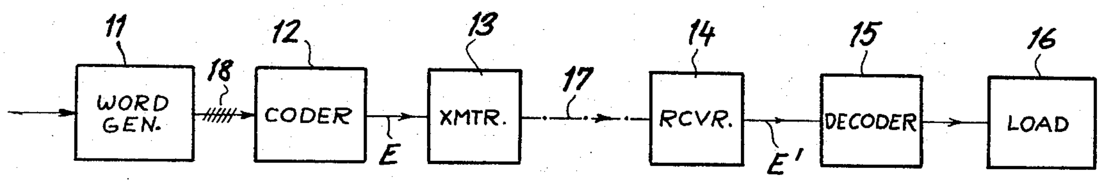
FIG. 1 is a block diagram showing an overall transmission system according to my invention.

In FIG. 1 I have shown a communication system for the transmission of 6-bit binary words. The transmission side of the system includes a word generator 11 which could be, for example, a keyboard-controlled teletype machine or an analog/digital converter receiving an amplitude-modulated message signal. In the latter case, as is well known, the first five bits may represent absolute amplitude whereas the sixth bit indicates positive or negative polarity.

Source 11 works via a six-conductor cable 18 (the number of parallel conductors being conventionally indicated by short transverse strokes) into a coder 12 more fully described hereinafter with reference to FIG. 2. The output E of the coder is fed to a transmitter 13 which sends it over a communication path 17 to an associated receiver 14; the latter, in turn, delivers the incoming code words E' to a decoder 15 shown in detail in FIG. 3. The decoded signal is fed to a load 16 which could be, for example, a teletyper or a digital/analog converter.

Figure 2:
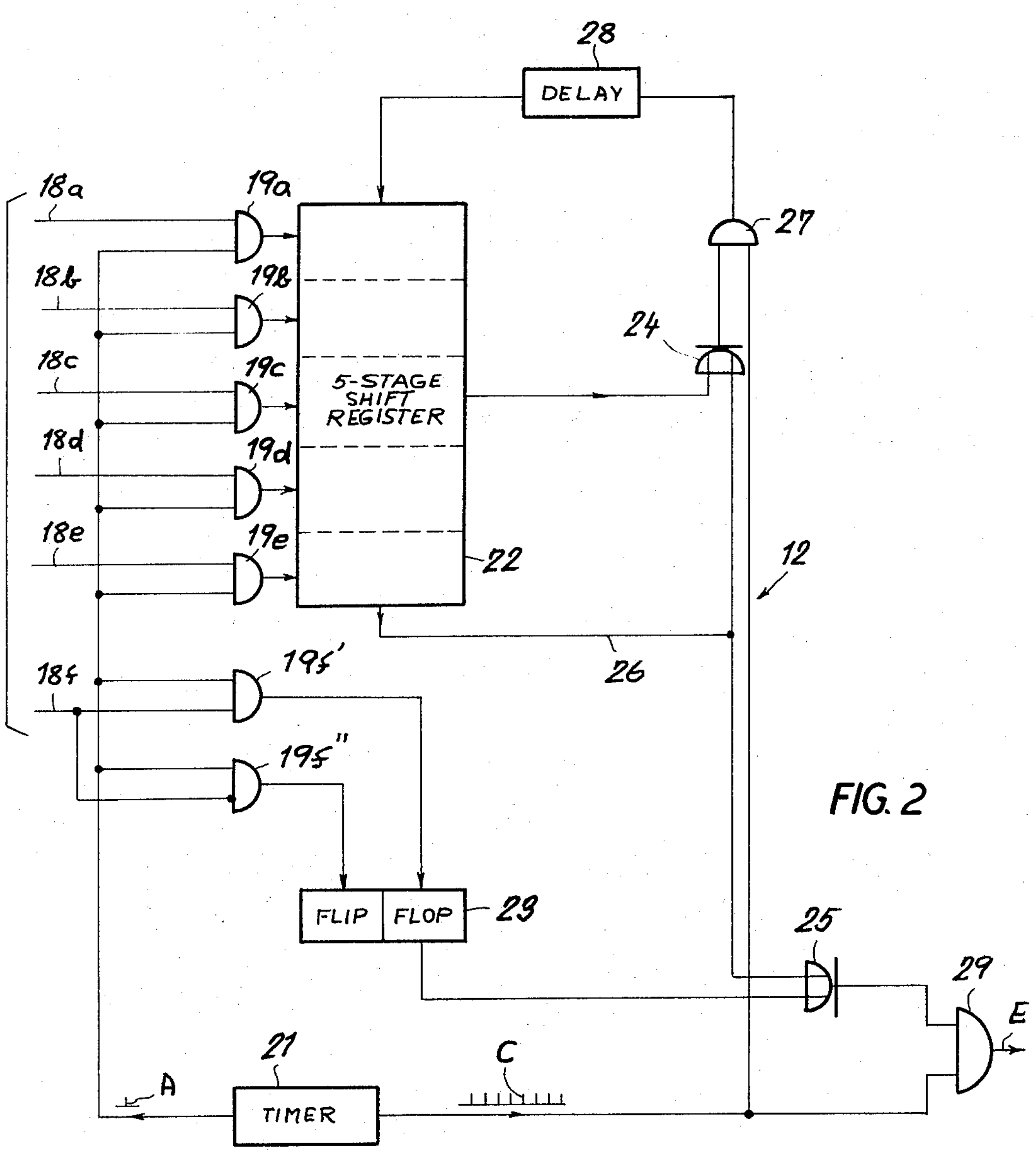
FIG. 2 is a more detailed circuit diagram of a coder included in the system of FIG. 1.

Reference will now be made to FIG. 2 for a description of coder 12. The coder is designed to process a succession of 6-bit words whose bits arrive over respective conductors 18*a*, 18*b*, 18*c*, 18*d*, 18*e* and 18*f* collectively represented in FIG. 1 by the cable 18. The five lowest-ranking bits are directed by way of respective AND gates 19*a*, 19*b*, 19*c*, 19*d* and 19*e* to corresponding stages of a 5-stage shift register 22 while the highest-ranking (sixth) bit either sets or resets a flip-flop 23, representing an ancillary binary stage, by way of two further AND gates 19*f'* and 19*f'* (gate 19*f''* having an inverting input connected to conductor 18*f*). All the gates are periodically opened by a gating pulse A from a timer 21 whose occurrence thus loads the shift register 22 and the flip-flop 23 with a newly arriving message word.

Shift register 22 has an output lead 26 extending from its fifth stage to respective inputs of two Exclusive-OR gates 24 and 25. Gate 24, which forms part of a feedback circuit of register 22, has its second input connected to an output lead of the third stage of that register and works into its first stage through an AND gate 27 in series with a delay network 28; the second input of AND gate 27 receives a train of stepping pulses C from timer 21. Gate 25 has its second input connected to the set output of flip-flop 23 and energizes one input of an AND gate 29 whose other input also receives the stepping pulse C; the output of gate 29 is a 31-bit code sequence E for each incoming message word.

Figures 7, 8, 9:
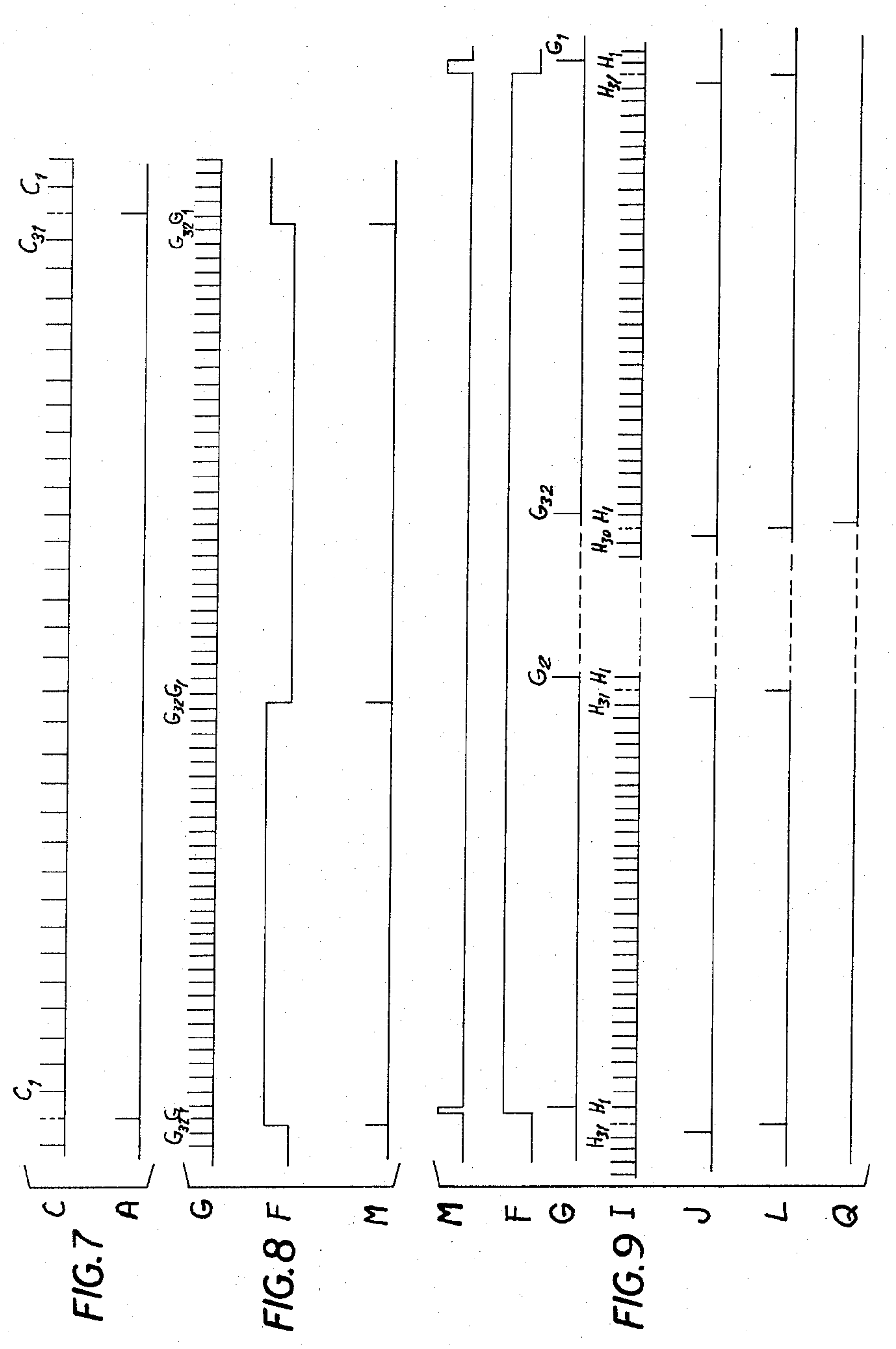
FIGS. 7, 8 and 9 are sets of graphs serving to explain the operation of the system of FIGS. 1 – 6.

FIG. 7 shows the relative timing of gating pulses A and stepping pulses C. Thus, the first pulse $C_1$ of a series of 31 such pulses occurs just after a gating pulse A whereas the last pulse $C_{31}$ of the series immediately precedes the next gating pulse. The repetition rate or cadence of pulses C is 32 times that of pulses A, with suppression of a pulse C coincident with pulse A.

Figure 3:
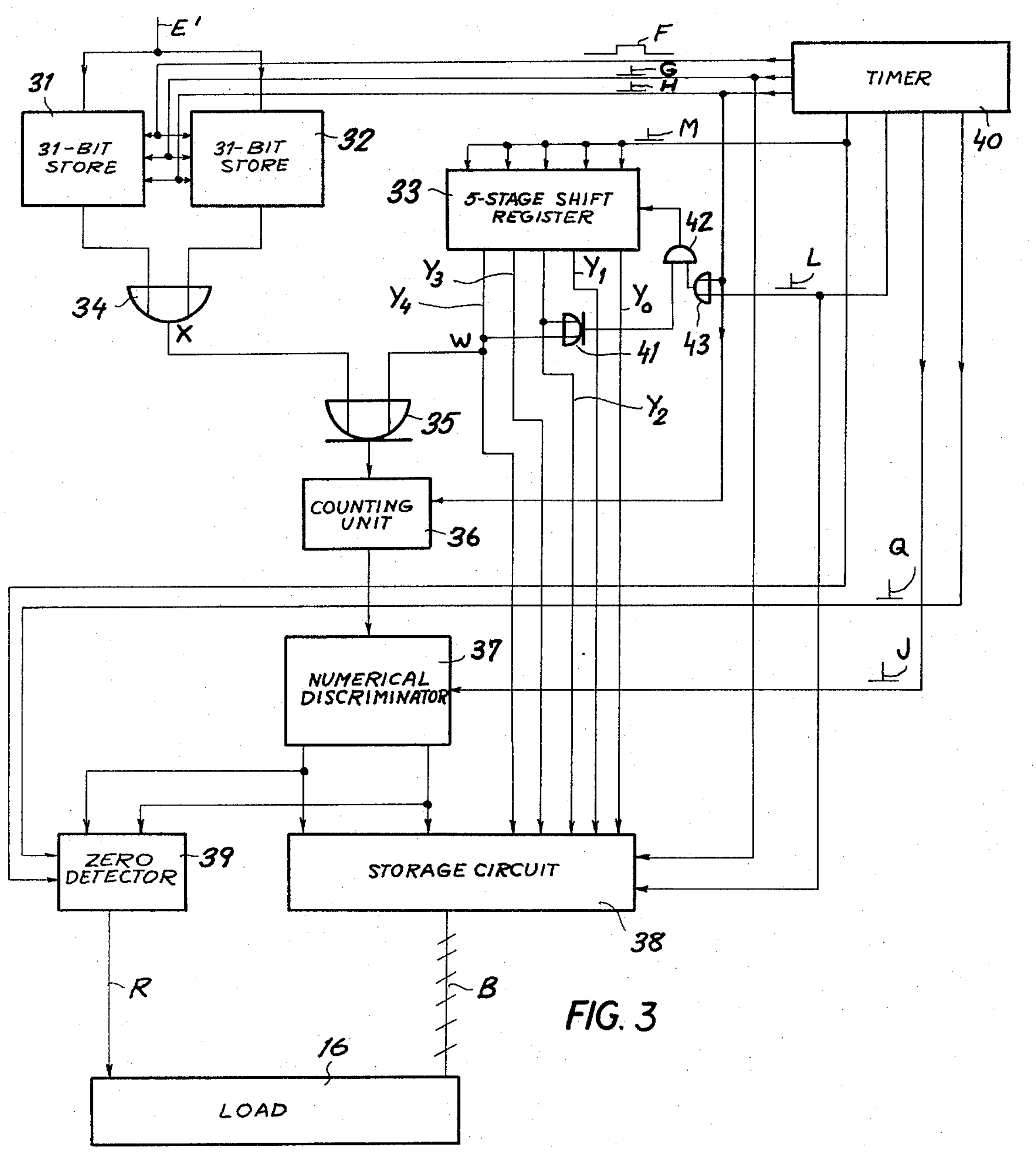
FIG. 3 is a similar circuit diagram of a decoder included in the system.

As will be explained more fully hereinafter with reference to FIGS. 3 and 10, shift register 22 generates on its output lead 26 a maximum sequence of 31 bits (corresponding to $2^{n-1}$ with $n = 5$) as the 5-bit combination originally entered therein is successively replaced, in a predetermined cyclic order, by all the other possible 5-bit combinations with the exception of 00000. (If the first five bits of the incoming word are all zeros, the aforedescribed permutation does not take place and an all-zero sequence is read out on lead 26.) If flip-flop 23 is not set, i.e., if the sixth bit of the incoming message word has the value zero, Exclusive-OR gate 25 passes the generated 31-bit sequence unchanged to AND gate 29 (and then to the transmitter 13, FIG. 1) as the code word E; if this sixth bit has the value 1, gate 25 acts as an inverter so that the word E in the output of gate 29 is the complement of the maximum sequence generated on lead 26. The purpose of delay network 28 is to prevent a change in the contents of register 22 until the bit of its fifth stage has been read out via gates 25 and 29.

Signal path 17 of FIG. 1 may include a radio link in which case the word E is modulated upon a carrier in transmitter 13 and demodulated in receiver 14. In any case, the decoder 15 receives a more or less exact replica E' of the original maximum sequence. As shown in FIG. 3, each incoming sequence E' is fed in parallel to two 31-bit stores 31 and 32 which are alternately enabled, under the control of a timer 40, to receive these sequences in response to a switching signal F having the form of a square wave. Timer 40 also generates a train of writing pulses G, recurring at the cadence of stepping pulses C on the transmission side, and a train of reading pulses G, recurring at the cadence of stepping pulses C on the transmission side, and a train of reading pulses H whose cadence is 32 times as high as that of pulses G. On the other hand, the fundamental frequency of switching signal F corresponds to half the cadence of gating pulses A so that 64 writing pulses G occur in any full switching cycle; this has been illustrated in FIG. 8 which shows the generation of a writing pulse $G_1$ immediately after a level change of signal F, and of a writing pulse $G_{32}$ immediately before the next level change. Each level change is also accompanied by the generation of a start pulse M on another output of timer 40.

Whenever one of the two stores 31, 32 is in its writing phase so as to register an incoming sequence E', the other store is stepped by reading pulses H at 32 times the rate of pulses G. Thus, as shown in FIG. 9, a reading pulse $H_1$ coincides with each of the 32 writing pulses $G_1 - G_{32}$ occurring within a half-cycle of switching signal F, i.e., within a period which may be referred to as a frame. The interval between two successive writing pulses may be termed a stepping cycle, there being 32 such cycles in a frame. However, the last ($32^{nd}$) reading pulse within each cycle is suppressed; in its place, the timer 40 generates a supplemental pulse L on a further output thereof. Other pulses produced by the timer are a pulse J occurring between each reading pulse $H_{31}$ and the following pulse L, and a pulse Q generated once per frame concurrently with the last writing pulse $G_{32}$ thereof. Pulse $G_{32}$ and the other pulses of the last cycle of the frame are functionless and may be suppressed.

The decoder 15 further comprises a five-stage shift register which is substantially identical with register 22 of coder 12 (FIG. 2). The register has five stage outputs $Y_0$, $Y_1$, $Y_2$, $Y_3$ and $Y_4$, the latter carrying a recurrent 31-bit comparison sequence W. A feedback connection extends from the third and fifth stage outputs $Y_2$ and $Y_4$ through an Exclusive-OR gate 41 and an AND gate 42 in series therewith; the second output of AND gate 42 receives the pulses H and L through an OR gate 43 to step the register 33 through 32 cycles per frame. This results in the generation of 32 comparison sequences W of which, however, only the first 31 are significant. The generation of each of these 31 comparison sequences coincides with a complete readout of an incoming sequence E′ as stored in unit 31 or 32, these two units working into a common OR gate 34 having an output X. Each of the two storage units 31, 32 recirculates the 31-bit sequence 31 times during its reading phase so that the same incoming sequence is read out jointly with each of the 31 different comparison sequences during a frame.

The two outputs X and W of storage circuit 31, 32 and of shift register 33 are fed to a comparator which includes an Exclusive-OR gate 35 working into a counting unit 36 which determines the number of bit coincidences per cycle.

As will be explained in detail hereinafter, there are 31 such coincidences whenever the recurrent incoming sequence in output X matches one of the comparison sequences in output W; this applies only to the phase in which the incoming sequence E′ is noninverted, i.e., in which the sixth bit of the original message word is zero so that flip-flop 23 of FIG. 2 is not set. If this sixth bit has a finite value (1), a comparison of the complementary sequence with the corresponding sequence from register 33 will not give rise to any coincidences during the cycle if the sequence E′ is identical with sequence E, i.e., if there is no error in transmission. In the case of a complete mismatch, i.e., a confrontation between an error-free incoming sequence and an unrelated comparison sequence, the number of bit coincidences is 15 for a noninverted sequence and 16 for its complement.

The number of coincidences registered in counting unit 36 at the end of each cycle is communicated to a numerical discriminator 37 distinguishing between three cases:

1. the count lies in the range of 24 through 31, indicating a match between a stored noninverted sequence and a comparison sequence from register 33 within a tolerance range $e = 2^{n-2} - 1 = 7$;

2. the count lies in the range from 0 through 7, thus indicating a match between a stored inverted sequence and a comparison sequence within the same tolerance range;

3. the count is larger than 7 but smaller than 24, thus indicating a mismatch within a tolerance range extending from $2^{n-2} - 1 - e$ to $2^{n-2} + e$.

In case (1) the discriminator 37 energizes a first output U; in case (2) a second output V is energized. Neither of these outputs carries a signal in case (3).

Outputs U and V terminate at a storage circuit 38 and, in parallel therewith, at a zero detector 39. Circuit 38 has six output leads collectively designated B in FIG. 3; these output leads, as well as an output lead R of zero detector 39, extend to the load 16.

At the beginning of each frame, timer 40 delivers the start pulse M to shift register 33 and to zero detector 39; the pulse M loads the shift register 33 with an invariable five-bit reference combination, here specifically the combination 11111, and resets the detector 39 as more fully described below in connection with FIG. 6. Counting unit 36 is enabled by the pulses H and is read and cleared by the pulse L at the end of each cycle, the latter pulse being also fed to storage circuit 38 for entering therein the instantaneous contents of shift register 33 (whose stage outputs $Y_0 - Y_4$ extend to that circuit) in the presence of a signal on the output U or V of discriminator 37 which is periodically activated by a pulse J. Pulse Q actuates the detector 39 at the end of a frame if neither of these discriminator outputs is energized in the course of that frame.

Figure 4:
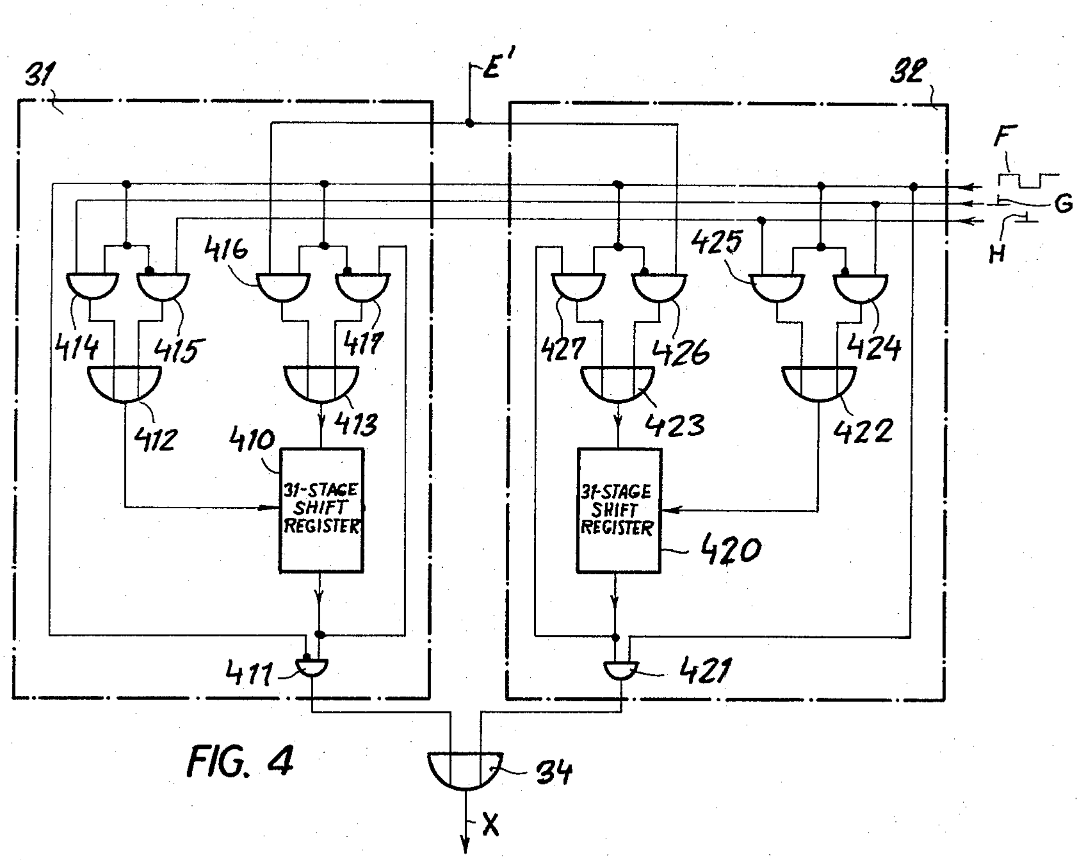
FIG. 4 shows details of a pair of storage units forming part of the decoder of FIG. 3.

FIG. 4 shows details of the storage units 31 and 32. The two units are mutually identical, each of them including a 31-stage shift register 410, 420 and a gating circuit in the input thereof; this gating circuit comprises two pairs of AND gates 417—417, 424–427 working into respective OR gates 412, 413 and 422, 423. Each AND gate has an input connected to a lead carrying the switching signal F, the corresponding inputs of gates 415, 417 and 424, 426 being inverting. The incoming code sequence E′ reaches the second inputs of gates 416 and 426 in parallel; the second inputs of gates 414 and 424 receive the reading pulses G whereas the second inputs of gates 415 and 425 are energized by the writing pulses H. A feedback circuit extends from the output of register 410 or 420 to the second input of AND gate 417 or 427, respectively. Each shift register also works into one input of a respective AND gate 411 or 421 whose other input, inverting in the case of gate 411 but noninverting in the case of gate 421, is switched by the signal F. The outputs of AND gates 411 and 421 are combined in OR gate 34.

Figure 5:
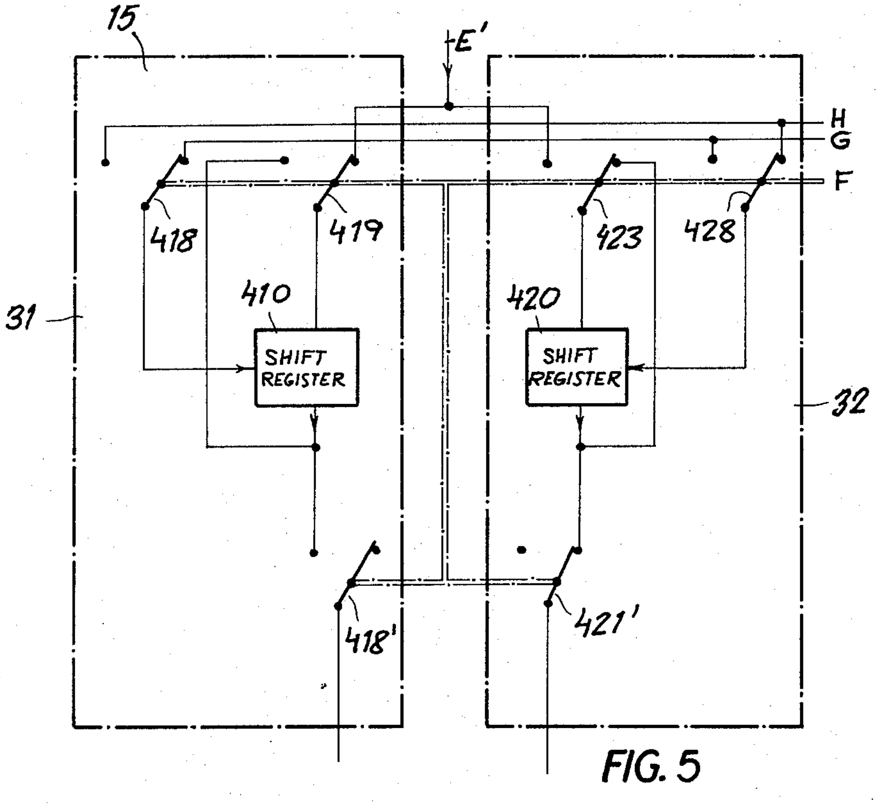
FIG. 5 shows an equivalent circuit for the storage units of FIG. 4.

FIG. 5 represents an equivalent circuit with switch contacts 418, 419 and 428, 429 taking the place of gates 412–417 and 422–427, respectively; two further switch contacts 411′ and 421′ represent the AND gates 411 and 412. All these switch contacts are ganged by a linkage symbolizing the switching signal F.

It will thus be apparent that in the writing phase of either shift register, specifically of register 410 in the position of FIG. 5, a stepping input of that register receives the pulses G in the rhythm of the incoming bits of sequence E′ which are thereby serially entered into the 31 register stages whose output and feedback paths are open-circuited at this point. The companion register (here 420), which is in the reading phase, is stepped at an accelerated rate by the pulses H whereby its contents are read out through OR gate 34 and are simultaneously recirculated to its input stage which at this point is disconnected from the receiver 14 of FIG. 1.

Figure 6:
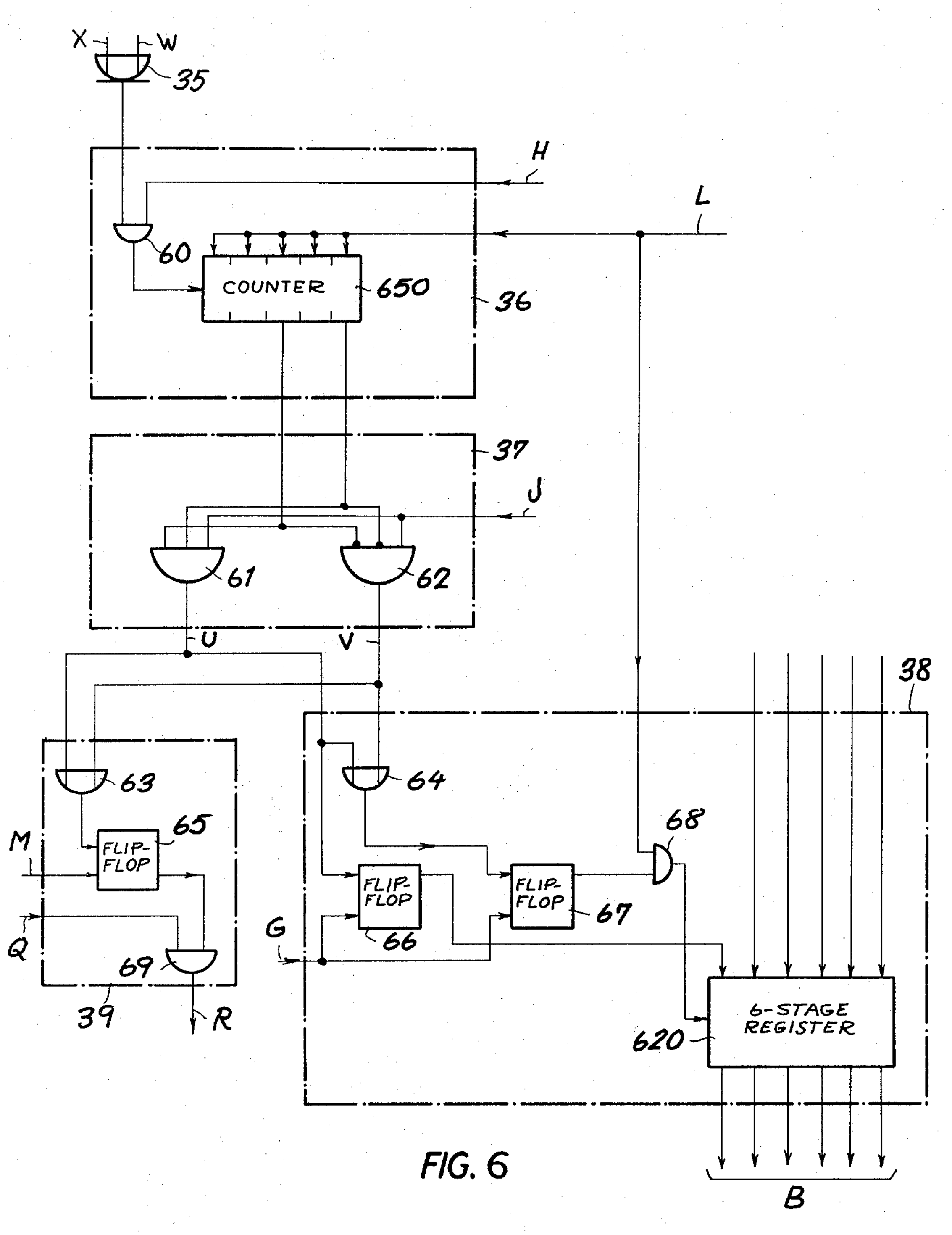
FIG. 6 shows details of other components included in the decoder of FIG. 3.

FIG. 6 shows the construction of components 36 – 39. Unit 36 comprises a five-stage binary counter 610 adapted to be stepped by way of an AND gate 60 having one input connected to the output of Exclusive-OR gate 35; another input of gate 60 receives the reading pulses H. The several stages of counter 610 are periodically cleared by the pulses L, with the contents of its fourth and fifth stages read out in parallel to two noninverting inputs of an AND gate 61 and two inverting inputs of an AND gate 62 forming part of the numerical discriminator 37. Each of these latter AND gates has a noninverting input energizable by the pulse J; discriminator outputs U and V originate at gates 61 and 62, respectively.

Exclusive-OR gate 35 has an output only when the bits in its two inputs do not coincide; thus, AND gate 60 conducts in the presence of a reading pulse H upon a noncoincidence of these bits. At the end of each cycle, therefore, counter 610 registers the exact number of times that unequal bits were read out by pulses $H_1 - H_{31}$ from storage circuit 31, 32 and from register 33. If this number is less than 8, only the first three stages of the counter are set; if it is 24 or higher, its fourth and fifth stages are set. Thus, the count of noncoincidences and therefore also the complementary count of coincidences (the two counts always adding up to 31) falls within the above-discussed tolerance ranges of 0 – 7 and 24 – 31 if these two counter stages are either both set or both reset. The first condition is detected by the AND gate 61 which thereupon generates the output signal U; the second condition results in the generation of output signal V by the AND gate 62.

Storage unit 38, which together with zero detector 39 constitutes the output circuit of the decoder 15, comprises two flip-flops 66 and 67 with setting inputs connected to output U of gate 61 and with resetting inputs receiving the reading pulses G; the setting input of flip-flop 67 is also connected, via an OR gate 64, to the output V of gate 62. Through an AND gate 68, opened at the end of each setting cycle by the pulse L, the set output of flip-flop 67 works into a control input of a six-stage register 620 whose first five stages have inputs connected to the stage outputs $Y_0 - Y_4$ of shift register 33. The sixth stage of register 620 has its input connected to the set output of flip-flop 66. The six stages of register 620 have output leads constituting the cable B.

Thus, if either gate 61 or gate 62 conducts in the course of a stepping cycle, the subsequent arrival of a pulse L opens the register 620 for inscription of the momentary contents of register 33 in its first five stages. The sixth stage of register 620 receives either a 1 or a 0, depending on whether flip-flop 66 has or has not been set by an output signal U. Since the presence of signal U indicates a high count of noncoincidences and therefore a low count of coincidences, flip-flop 66 is set only if the comparison sequence from register 33 is matched (with permissible tolerances) by an inverted sequence received over the transmission path 17; the fact of inversion, in turn, denotes a finite sixth bit in the original message word (i.e., on lead 18*f* of FIG. 2) so that the sixth bit stored in register 620 has the same value as its original counterpart.

If the first five bits of the original message word are all zeroes, then the sequence of bits read out an output X also consists exclusively of zeroes (or ones, in the event of an inversion) except for transmission errors. In that event no match will be detected throughout the cycle so that outputs U and V remain de-energized and flip-flop 67 is not set. Another flip-flop 65 within zero detector 39, reset by the start pulse M at the beginning of each frame, is reset by either of the two output signals U, V via an OR gate 63; the condition of flip-flop 65 at the end of a frame is tested by the pulse Q applied to one input of an AND gate 69 whose other input is tied to the reset output of the flip-flop. Thus, failure to set the flip-flop 65 at any time within the frame indicates the transmission of an all-zero (or all-one) code sequence and results in the energization of output R. The occurrence of signal R therefore indicates that the original word was either 000000 or 100000, there being generally no need to distinguish between these two bit combinations.

Figure 10:
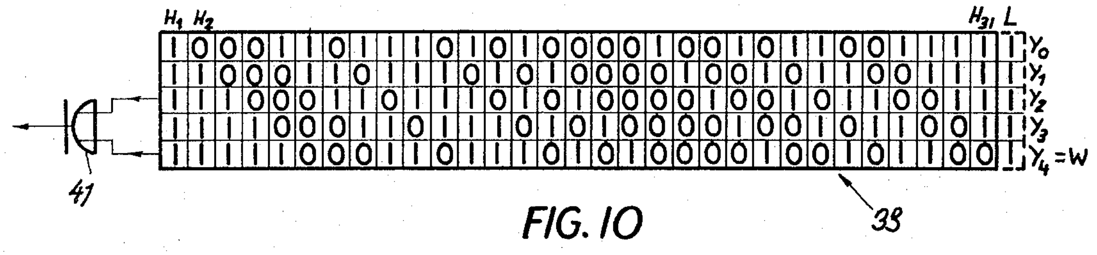
FIG. 10 represents a sequence of 5-bit combinations successively entered in a shift register of the decoder of FIG. 3.

Reference will now be made to FIG. 10 which shows the several bit combinations appearing on stage outputs $Y_0 - Y_4$ of shift register 33 in the course of a cycle in which this register is stepped by pulses $H_1 \ldots H_{31}$, L from OR gate 43. This being the first cycle of a frame, the start pulse M overrides the normal operation of the feedback circuit 41 – 43 to load the register 33 with the reference code 11111 at the instant of occurrence of the first stepping pulse $H_1$. Exclusive-OR gate 41, in comparing the bits entered in the third and fifth stages, causes the introduction of a 0 into the first stage upon the occurrence of the next stepping pulse $H_2$ while the bits of the first four stages are shifted by one stage each. On the second step, therefore, the register contains the bit combination 01111. On the 31st step (pulse $H_{31}$) the registered bits are 11110; it will be seen that all 31 bit combinations are different from one another. The 31 bits of the fifth stage, appearing in output $Y_4 = W$, constitute a maximum 31-bit sequence recurring identically in successive cycles. Since, however, the occurrence of the 32nd stepping pulse L restores the initial code 11111 at the very end of the first cycle, the sequence begins in the second cycle with its second bit combination 01111, and so forth throughout the 31 cycles introduced by pulses G1 – G31. As the supplemental pulse L does not open the AND gate 61 of counting unit 36, the bit appearing in output W on the 32nd step of any cycle is ineffectual. Thus, comparator 35, 36 receives in the course of a frame all 31 permutations of the 31-bit sequence shown in the bottom row of FIG. 10.

It may be mentioned that an equivalent maximum sequence may be obtained by connecting one of the inputs of Exclusive-OR gate 41 to the output of the second rather than the third stage of register 33; the same applies, of course, to Exclusive-OR gate 24 and register 22. Analogous feedback connections are possible in the case of a number of register stages *n* different from 5.

The identity of the contents of register 33 on the first and the 32nd step of each cycle enables the readout, at the instant of pulse L, of the same 5-bit combination that heads the comparison sequence of the cycle in which a match is detected. The term "match," as here employed, allows for deviation of up to 7 bits per cycle from an exactly identical or complementary relationship.

A comparison of the bits of any two rows of FIG. 10 reveals 15 coincidences and 16 noncoincidences in each case. The same holds true for comparisons with further permutations of the same basic sequence.

Register 33, whose permutations always develop from a reference combination such as 11111, can never contain an all-zero combination (00000). Such a combination, however, may occur in register 22 if its input leads 18*a* – 18*e* are all de-energized; in that case all the bits shown in FIG. 10 would be zero.

I claim:

1. A system for the transmission of binary words, each word consisting of $n + 1$ bits, comprising:

a first shift register with *n* stages for receiving *n* bits of a word to be transmitted;

first feedback means connected to said first shift register for sequentially developing an *n*-bit combination stored therein into an invariable cyclic succession of $2^n - 1$ *n*-bit combinations starting with the combination originally stored;

first stepping means connected to said first feedback means for driving said first shift register through a full cycle of $2^n - 1$ combinations with resulting generation of a maximum sequence of $2^n - 1$ bits in any stage thereof;

a second shift register provided with second feedback means, said first and second feedback means each comprising an Exclusive-OR gate with input connections to the $n^{th}$ stage and to a lower-ranking stage of the associated shift register;

second stepping means substantially duplicating said first shift register, first feedback means and first stepping means, respectively, for generating maximum comparison sequences of $2^n-1$ bits each;

timing means operable at the beginning of a frame of at least $2^n-1$ cycles of said second stepping means for introducing into said second shift register an $n$-bit reference combination recurring every $2^n-1$ steps, each cycle of said second stepping means consisting of a number of steps greater than $2^n-1$ whereby each cycle of a frame begins with a different starting combination in said second shift register;

storage means connected to said receiving means for preserving an incoming maximum sequence over $2^n-1$ cycles of said second stepping means;

comparator means connected to said storage means and to a stage of said second shift register for successively comparing the bits of said incoming maximum sequence with the bits of all $2^n-1$ comparison sequences emitted by the last-mentioned stage in the course of a frame, said comparator means including a counter for registering the number of bit coincidences between said incoming sequence and any one comparison sequence;

numerical discriminator means connected to said counter for generating an output signal upon the number of bit coincidences in any cycle of said second stepping means deviating by more than a predetermined amount from a mismatch-indicating count of $[(2^{n-1}-1)/2] \pm ½$;

output means connected to said discriminating means and controlled by said timing means for extracting from said second shift register the starting combination of the cycle in which said output signal is generated; and an ancillary stage for the $(n+1)^{th}$ bit of a word and a further Exclusive-OR gate with input connections to said one stage of said first shift register and to said ancillary stage for converting the generated maximum sequence into its complement in the presence of a finite $(n+1)^{th}$ bit.

2. A system as defined in claim 1 wherein $n = 5$, said lower-ranking stage lying between the first and fourth stages of the shift register.

3. A system as defined in claim 1 wherein said discriminating means comprises logical circuitry for generating an output signal of a first kind upon the number of bit coincidences exceeding $2^n-2-e$ and an output signal of a second kind upon the number of bit coincidences being less than $e + 1$, $e$ being a measure of maximum permissible error and being at most equal to $2^{n-2}-1$, further comprising supplemental output means connected to said discriminating means for indicating the value of the $(n + 1)^{th}$ bit according to the kind of output signal generated.

4. A system as defined in claim 1, further comprising zero-detection means connected to said discriminating means and controlled by said timing means for indicating an all-zero bit combination upon the absence of said output signal over an entire frame.

5. A system as defined in claim 1 wherein said storage means comprises a pair of buffer registers of $2^n-1$ stages each controlled by writing and reading signals from said timing means for alternately storing an incoming sequence and reading out a sequence previously stored.

6. A system as defined in claim 5 wherein each of said buffer registers is a shift register with a feedback connection closed in a reading phase for recirculating the stored sequence, said feedback connection being opened in a writing phase.

7. A system as defined in claim 1 wherein said transmission means and said comparator means are connected to the $n^{th}$ stage of said first and said second shift register, respectively.

8. A system as defined in claim 1 wherein said timing means delivers $2^n-1$ stepping pulses per cycle to said storage means and a final pulse at the end of each cycle to said output means for actuating same, said second stepping means being connected to receive both said stepping pulses and said final pulse from said timing means whereby the number of steps taken by said second shift register during each cycle equals $2^n$.

* * * * *